United States Patent
Suzuki et al.

(10) Patent No.: US 7,650,475 B2
(45) Date of Patent: Jan. 19, 2010

(54) STORAGE SYSTEM AND METHOD FOR MANAGING DATA USING THE SAME

(75) Inventors: Hidenori Suzuki, Atami (JP); Kazuhide Sano, Fujinomiya (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 11/512,250

(22) Filed: Aug. 30, 2006

(65) Prior Publication Data

US 2008/0010422 A1 Jan. 10, 2008

(30) Foreign Application Priority Data

Jul. 5, 2006 (JP) .............................. 2006-185891

(51) Int. Cl.
*G06F 13/00* (2006.01)
*G06F 13/28* (2006.01)

(52) U.S. Cl. ....................................... 711/162; 711/161

(58) Field of Classification Search ........................ None
See application file for complete search history.

(56) References Cited

U.S. PATENT DOCUMENTS

| 7,167,880 B2 * | 1/2007 | Amano et al. ............... 707/205 |
| 2006/0031647 A1 * | 2/2006 | Hirakawa et al. ........... 711/162 |
| 2007/0276884 A1 * | 11/2007 | Hara et al. ................... 707/204 |

FOREIGN PATENT DOCUMENTS

JP 2005-18738 1/2005

OTHER PUBLICATIONS

U.S. Appl. No. 11/450,259, filed Jun. 2006, Okada.
U.S. Appl. No. 11/328,285, filed Jan. 2006, Suzuki.

* cited by examiner

*Primary Examiner*—Kevin Verbrugge
*Assistant Examiner*—Eric S Cardwell
(74) *Attorney, Agent, or Firm*—Brundidge & Stanger, P.C.

(57) ABSTRACT

A storage apparatus enables efficient data restoration even if restoration is attempted using several different restoration points. The storage system is connected to a host apparatus, and includes a storage unit having various logical volumes formed therein and a controller configured to control I/O processing with respect to the storage unit. The controller stores journal data for a data volume in a journal volume, and also stores snapshot data for the data volume in a snapshot volume. In accordance with a restoration request designating a restore point, the controller restores the data volume to the state it was in as of the designated restore point, by applying the snapshot data stored in the snapshot volume and subsequently applying the journal data stored in the journal volume. During that process, the controller saves the data in the data volume to which certain journal data is going to be applied, in a journal backup volume.

18 Claims, 14 Drawing Sheets

| Serial No. | Time | Data | Address |
|---|---|---|---|
| ⋮ | ⋮ | ⋮ | ⋮ |
| 10 | 10:00 | AAA | 0000 |
| 11 | 10:10 | BBB | 0000 |
| 12 | 10:20 | CCC | 0000 |
| 13 | 10:30 | DDD | 0001 |
| 14 | 10:40 | EEE | 0000 |
| 15 | 10:50 | FFF | 0000 |
| 16 | 11:00 | GGG | 0001 |
| ⋮ | ⋮ | ⋮ | ⋮ |

*Fig. 4*

| No. | Marker Comments | JNL No. | Time |
|---|---|---|---|
| 1 | Marker 1 | 11 | 10:15 |
| 2 | Marker 2 | 13 | 10:35 |
| 3 | Marker 3 | 15 | 10:55 |
| ⋮ | ⋮ | ⋮ | ⋮ |

*Fig. 5*

| Serial No. | Time | Data | Address | Flag |
|---|---|---|---|---|
| 10 | 10:00 | XXX | 0000 | 0 |
| 11 | 10:10 | null | 0000 | 1 |
| 12 | 10:20 | BBB | 0000 | 0 |
| 13 | 10:30 | null | 0001 | 1 |
| 14 | 10:40 | CCC | 0000 | 0 |
| 15 | 10:50 | EEE | 0000 | 0 |

*Fig. 13*

STORAGE SYSTEM AND METHOD FOR MANAGING DATA USING THE SAME

CROSS-REFERENCES TO RELATED APPLICATIONS

This application relates to and claims priority from Japanese Patent Application No. 2006-185891, filed on Jul. 5, 2006, the entire disclosure of which is incorporated herein by reference

BACKGROUND

1. Field of the Invention

The present invention relates to a storage system and method for managing data using the same. In particular, the invention relates to a storage system having an improved journaling file system, and a data backup and restoration method employing the journaling file system.

2. Description of Related Art

In order to protect data from accidental loss in computer systems, data is backed up, and restored/recovered using storage apparatuses. Snapshot technology and journaling technology are well known for data protection technologies used in a computer system. The snapshot technology includes storing data images (snapshot data) for a file system or volume at a point in time. For example, if data has been lost due to a failure, the data can be restored to its state prior to the data loss, by referring to the stored snapshot data. The journaling technology includes storing, upon data-write, the data to be written and the timestamp of the data-write, as journal data. In recent years, storage apparatuses provided with high-speed data restoration mechanisms integrating those journaling and snapshot technologies have been receiving attention.

As one example, Japanese Patent Laid-open Publication No. 2005-18738 discloses a storage apparatus that, in response to a write request from a host apparatus, stores journal data for application data to be stored in a data volume and also stores snapshot data for the data volume, for example, at regular intervals. If restoration of data as of a particular point in time is requested, the snapshot data closest to the requested point is applied to a data volume, and then the relevant journal data is applied, restoring data in a final state.

In conventional manners of restoring data, system administrators generally select a particular past point to which data is to be restored, which is called a restore point or recovery point, and have a data volume restored as it is at the selected restore point in the past. While at work, the system administrator usually attempts data restoration not only for just one restore point, but for several restore points so that optimum restoration results can be obtained.

According to the conventional manners, the above-explained steps need to be executed every time data restoration is attempted for each new restore point. More specifically, even if one restore point is just changed to another, the same series of steps, including application of snapshot data and application of journal data, needs to be performed. Those steps put a large load on the system, and so a considerable length of time is taken for restoration, but even so, no efficient method for data restoration has been considered until now.

SUMMARY

According to one aspect of the present invention, provided is a storage apparatus connected to a host apparatus, that performs data back-up and restoration. The storage apparatus includes a storage unit having at least a data volume, a journal volume, a snapshot volume and a journal backup volume formed therein, and a controller configured to control I/O transaction with respect to the storage unit. The controller includes: a journaling unit configured to generate journal data for the data volume and to store the generated journal data in the journal volume; a snapshot unit configured to generate first snapshot data for the data volume and to store the generated first snapshot data in the snapshot volume; a data restoration unit configured to restore, in accordance with a restoration request designating a restore point, the data volume to the state it was in as of the restoration point, by applying the first snapshot data stored in the snapshot volume and the journal data stored in the journal volume; and a journal data backup unit configured to store, in the journal backup volume, data in the data volume to which the journal data is going to be applied by the data restoration unit.

The snapshot unit is also configured to generate second snapshot data for the data volume immediately after the data volume has been restored by the data restoration unit, and store the generated second snapshot data in the snapshot volume.

According to another aspect of the invention, provided is a data management method for backing up data and restoring the backed-up data in a storage apparatus connected to a host apparatus. In this data management method, the storage apparatus forms a data volume, a journal volume, a snapshot volume and a journal backup volume in a storage unit, and stores journal data for the data volume in the journal volume and also stores first snapshot data for the data volume in the snapshot volume. When the storage apparatus receives a restoration request designating a restore point, the storage apparatus applies the first snapshot data stored in the snapshot volume to a data volume specified as a base for restoration, and subsequently applies the journal data stored in the journal volume to the base data volume to which the first snapshot data has been applied. When applying the journal data, the storage apparatus stores, in the journal backup volume, data in the base data volume to which the journal data is going to be applied.

When the data volume has been restored by the application of the journal data, second snapshot data is immediately generated for that restored data volume, and the generated snapshot data is stored in the snapshot volume.

According to the present invention, even when data restoration is attempted using several restore points to obtain optimum restoration results, data can be restored efficiently.

Other aspects and advantages of the invention will be apparent from the following description and the appended claims.

BRIEF DESCRIPTION OF THE DRAWINGS

FIG. 4 illustrates journal data in a journal volume in a storage apparatus according to an embodiment of the invention.

FIG. 5 illustrates a marker management table in a storage system including a storage apparatus according to an embodiment of the invention.

FIG. 13 illustrates backup data in a journal backup volume, and a scheme of how the backup data is applied, in a storage apparatus according to an embodiment of the invention.

DETAILED DESCRIPTION OF PREFERRED EMBODIMENTS

The foregoing and other objects, features and advantages of the invention will be apparent from the following more detailed description of preferred embodiments of the invention, as illustrated in the accompanying drawings.

Figure 1:
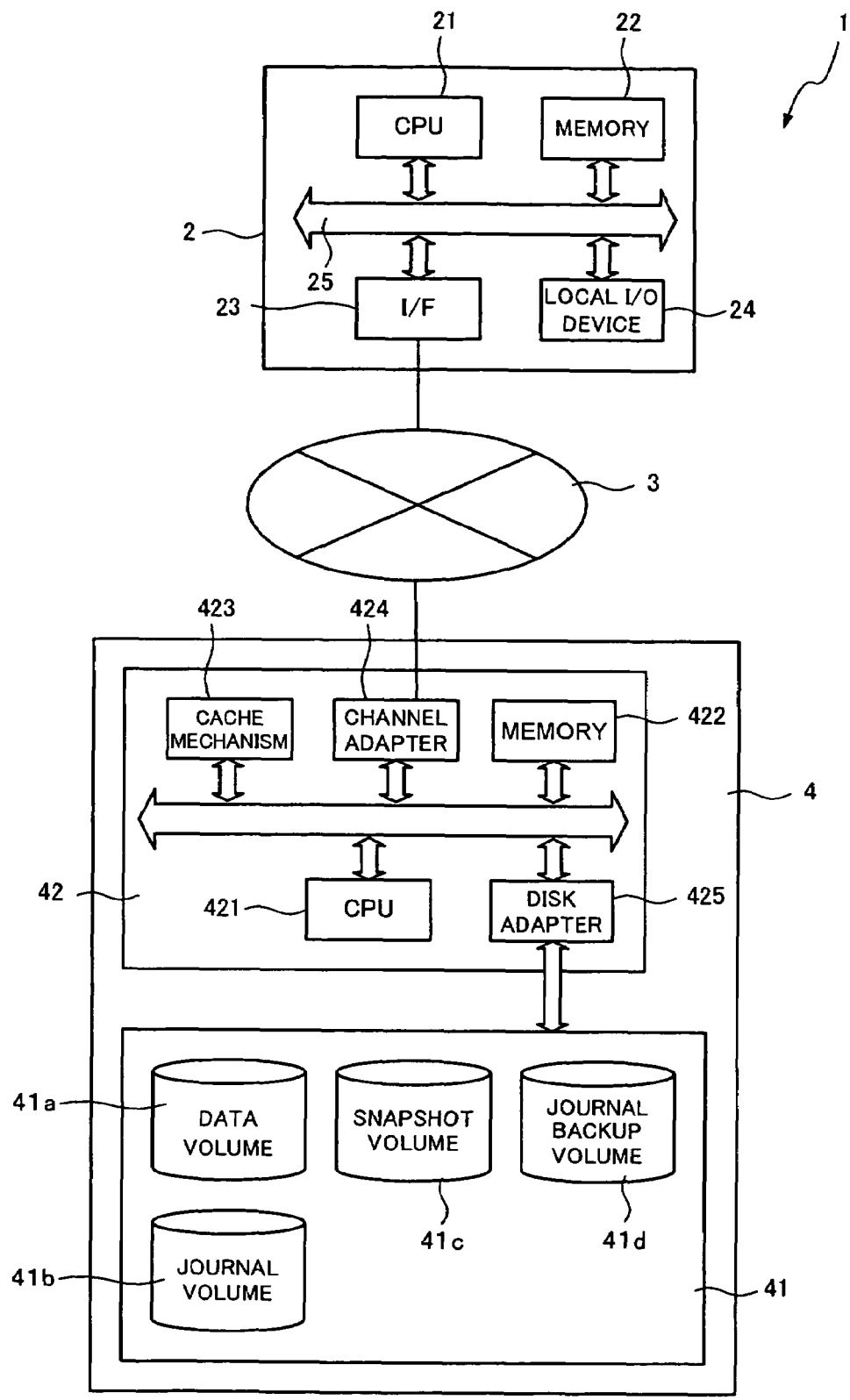
FIG. 1 is a diagram illustrating a storage system including a storage apparatus according to an embodiment of the invention.

FIG. 1 illustrates a storage system configured by a storage apparatus according to an embodiment of the invention. Referring to FIG. 1, a storage system 1 includes a host apparatus 2, which serves as an upper apparatus, and a storage apparatus 4, which serves as a lower apparatus, connected to each other via a network system 3.

The host apparatus 2 may be a personal computer, workstation, or mainframe. The host apparatus 2 has hardware resources, such as a CPU (Central Processing Unit) 21, main memory 22, an interface unit 23, and a local I/O device 24, which are interconnected via an internal bus 25. The host apparatus 2 also has software resources, such as device drivers, an operating system (OS), and one or more application programs. With this configuration, the host apparatus 2 executes various programs under the control of the CPU 21, and achieves desired processing in cooperation with the hardware resources. For example, under the control of the CPU 21, the host apparatus 2 executes an application program on the OS. The application program is a program for achieving the processing that the host apparatus 2 primarily intends to execute. Upon its execution, the application program requests access (such as data-read or data-write) to the storage apparatus 4. For such access, a storage manager may be installed on the host apparatus 2. The storage manager is a management program for managing access to the storage apparatus 4. The storage manager may also receive and manage markers to show points in time to which users can restore data, and if a user needs data restoration, the storage manager generates a data restoration request by presenting the managed markers to the user. The markers may be set arbitrarily, according to a user's input, or a point in time where an application program has ended may be selected and set as a marker. The storage manager may be separate from the OS, or it may be incorporated to form a part of the OS. Various programs may be configured as a single module or as a plurality of modules.

The network system 3 is, for example, a SAN (Storage Area Network), LAN (Local Area Network), Internet, public line, dedicated line, or similar. Communication between the host apparatus 2 and the storage apparatus 4 via the above network system 3 is performed in accordance with, for example, Fibre Channel Protocol if the network 3 is a SAN, or TCP/IP (Transmission Control Protocol/Internet Protocol) if the network 3 is a LAN.

The storage apparatus 4 includes a storage unit 41 comprising a plurality of physical disk devices, and a controller 42 configured to perform overall control for the storage unit 41.

The disk devices are selected from, for example, FC (Fibre Channel) disks, FATA (Fibre Attached Technology Adapted) disks, SATA (Serial AT Attachment) disks, optical disk drives, or similar. In a storage area provided by one or more disk devices, one or more logically defined volumes (hereinafter referred to as logical volumes) are established.

Each logical volume is assigned a unique identifier (LUN: Logical Unit Number), and managed in accordance with the identifier. The logical volumes are accessed in blocks of a specific size. Each block is given a logical block address (LBA). Thus, the host apparatus 2 can access a target logical volume by specifying an address based on the above identifier and logical block address to the controller 42 in the storage apparatus 4.

Each logical volume is given an attribute according to, for example, its purpose of use. In the storage unit 41 defined are a data volume 41a, a journal volume 41b, a snapshot volume 41c, and a journal backup volume 41d. Among other things, the journal volume 41b, the snapshot volume 41c, and the journal backup volume 41d are volumes used for data backup.

The data volume 41a is a volume used when the application program reads/writes data. As explained later in another embodiment, the data volume 41a may be defined as a part of a virtual logical volume. The journal volume 41b is a volume for storing journal data, which is update history information for the data volume 41a. The journal data typically includes: data written to the data volume 41a, an address in the data volume 41a to which the data has been written, and management information, e.g., the time when the data was written. The snapshot volume 41c is a volume for storing snapshot data (images) of the data volume 41a at particular points in time. The snapshot data may be configured as difference data. The journal backup volume 41d is a volume used for storing and saving the data in the data volume 41a to which certain journal data is going to be applied during a data restoration process.

Figure 2:
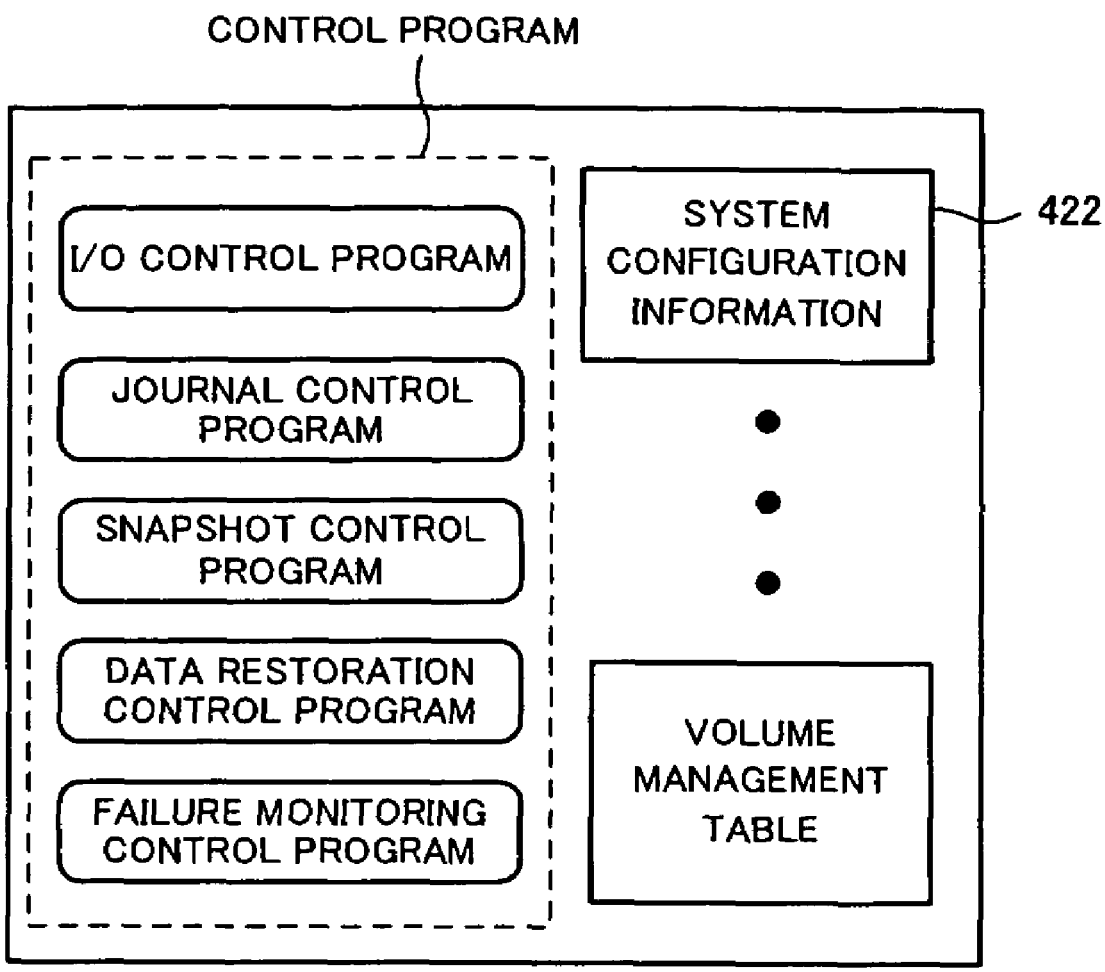
FIG. 2 illustrates the content of the memory in a controller in a storage apparatus according to an embodiment of the invention.

The controller 42 is a system circuit including, among other things, a CPU 421, memory 422, and a cache mechanism 423, and performs overall control over inputs/outputs between the host apparatus 2 and the storage unit 41. The controller 42 also includes a plurality of channel adapters 424 and a plurality of disk adapters 425. The memory 422 functions as the main memory for the CPU 421. For example, as shown in FIG. 2, the memory 422 stores various control programs, system configuration information, a management table, etc., to be used by the CPU 421. In this embodiment, an I/O control program, a journal control program, a snapshot control program, and a data restoration control program are installed as those control programs. A monitoring control program may be installed. The monitoring control program executes processing including, for example, monitoring whether or not any failure occurs in the storage apparatus 4 and informing a user (system administrator) if a failure occurs. These control programs and various kinds of information are, for example, read out from specific disk devices and loaded into the memory 422 when the storage apparatus 4 is powered on, under the control of the CPU 421. Alternatively, if the memory 422 is configured to include a rewritable-nonvolatile RAM, the programs and information may be constantly kept on that nonvolatile RAM.

Referring back to FIG. 1, the cache mechanism 423 comprises cache memory, and is used for temporarily storing data input/output between the host apparatus 2 and the storage unit 41. More specifically, commands sent from the host apparatus 2 are temporarily held in the cache memory, and data read from the data volume 41a in the storage unit 41 is temporarily held in the cache memory before being transmitted to the host apparatus 2.

Each channel adapter 424 is, in itself, a system circuit including a microprocessor, memory and a communication interface, and provides a port for connection to the network system 3. The channel adapters 424 interpret and execute various commands sent from the host apparatus 2 via the network system 3. A port of Each channel adapter 424 is given a network address, by which each channel adapter 424 can be identified in the network system 3 and function as NAS (Network Attached Storage).

Each disk adapter 425 is also, in itself, a system circuit including a microprocessor, memory and a communication interface, and functions as an I/O interface performing protocol control for communication with the disk devices in the storage unit 41. For example, the disk adapters 425 are connected to the corresponding disk devices in the storage unit 41 via a Fibre Channel cable, and send/receive data to/from those disk devices in accordance with Fibre Channel Protocol.

Data management in the storage system according to this embodiment is based on the premise that specific backup processing is executed for the data volume 41a. More specifically, update history information for the data volume 41a is collected as journal data, and stored in the journal volume 41b. That journaling processing is executed by the journal control program installed on the controller 42. Also, snapshot data for the data volume 41a is obtained either regularly or irregularly, and stored in the snapshot volume 41c. The so-obtained backup data is configured to be used for data restoration processing. That snapshot processing is executed by the snapshot control program installed on the controller 42.

Typically, journal data is generated upon every data-write request being made from the host apparatus 2. Also, snapshot data is generated at predetermined times, or in response to snapshot requests from the host apparatus 2. In the host apparatus 2, markers for showing particular points to which data can be restored are prepared and managed in a marker management table. When so instructed by a system administrator, the host apparatus 2 generates a restoration request including a restore point selected from among those markers, and transmits the generated request to the storage apparatus 4.

Figure 3:
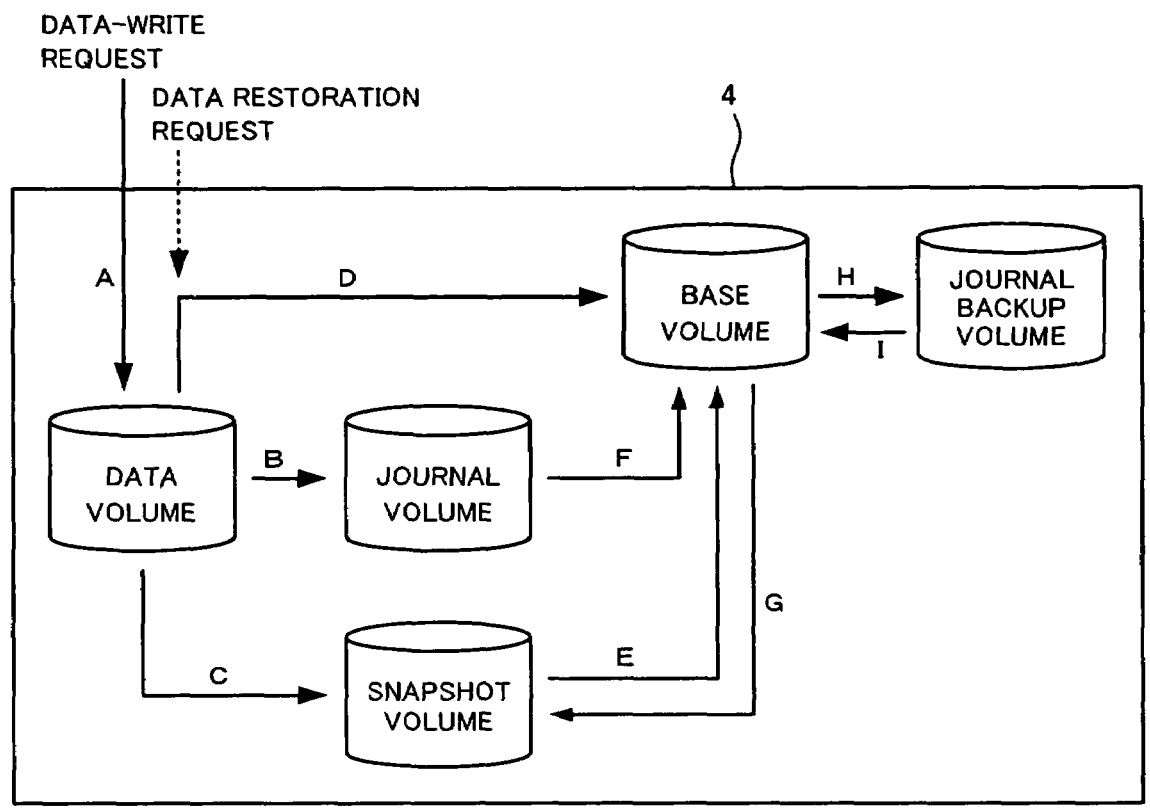
FIG. 3 overviews data backup/restoration processing in a storage apparatus according to an embodiment of the invention.

FIG. 3 overviews data backup/restoration processing in the storage apparatus 4 according to this embodiment. As shown in FIG. 3, when the storage apparatus 4 receives a data-write request with a data entity to be written from the host apparatus 2, the storage apparatus 4 writes the data entity to a specific area in the data volume 41a (arrow A in FIG. 3), and also generates journal data associating the data entity with journal management information composed of an address to which the data entity has been written and a date and time that the write transaction was performed, and stores the generated journal data in the journal volume 41b (arrow B in FIG. 3).

Also, in the storage apparatus 4, for example, a particular time is preset as a time when a snapshot is taken, and when the preset time comes, the storage apparatus 4 takes a snapshot of the data volume 41a to obtain snapshot data. The storage apparatus 4 then creates snapshot management information including the date and time that the snapshot was taken, and records it in a snapshot management table, and also stores the above snapshot data in the snapshot volume 41c in association with the snapshot management information (arrow C in FIG. 3). The snapshot data may be, for example, composed of chronologically structured difference data.

If the storage apparatus 4 receives a data restoration request from the host apparatus 2, the storage apparatus 4 starts data restoration processing. The data restoration request typically includes a restore point designated using a specific marker. More specifically, in order to apply the relevant snapshot data structured as difference data, the storage apparatus 4 identifies the data volume at a particular point in time, which will be used as a base for restoration, and makes a base volume 41a', for example, by duplicating the contents of the above-identified data volume in disk device(s) controlled by another disk adapter 425 (arrow D in FIG. 3). In other words, the so-obtained base volume 41a' is a copy of the data volume 41a at a particular point on the time-line. Then, the storage apparatus 4 sequentially applies the relevant difference data to the base volume 41a' so that data as of the closest preceding point in time when a snapshot was taken relative to the designated restore point (referred to as the "closest snapshot") is restored in the base volume 41a' (arrow E in FIG. 3). The storage apparatus 4 also sequentially applies journal data generated during the period from the closest snapshot to the designated restore point, to the base volume 41a' that has been restored to the closest snapshot time, and thereby restores the data volume 41a in a final state (arrow F in FIG. 3). At the same time, the storage apparatus 4 stores the data in the base volume 41a' to which journal data is going to be applied, in the journal backup volume 41d (arrow G in FIG. 3). The storage apparatus 4 then takes a snapshot of the final restored data volume 41a, and obtains snapshot data for the same (H in FIG. 3). As explained later, if a data restoration request designating another restore point is made, the data backed up in the journal backup volume 41d is used, under specific conditions, together with the snapshot data obtained when the previous restoration was completed, to restore data (arrows E and I in FIG. 3).

FIG. 4 illustrates journal data in a journal volume 41b in a storage apparatus 4 according to an embodiment of the invention. As explained before, the journal data is generated upon a data-write request being made from the host apparatus 2, under the control of the controller 42, and stored in the journal volume. Referring to FIG. 4, each item of the journal data is composed of, for example, a write data entity and an address, and is identified using serial numbers. For example, the journal data having a serial number of "13" shows that data of "DDD" was written in an area in the data volume with an address of "0001" at the time of "10:30."

The point in time when certain journal data has been generated can be a restore point. If a system administrator wants to record that point in time as a restore point, the storage manager sets the restore point associated with the journal data as a marker. A point in time when an application program using the storage apparatus ends its operation may also be set as a marker.

FIG. 5 illustrates a marker management table in a storage system including a storage apparatus 4 according to an embodiment of the invention. Like the journal data, the markers are also controlled using serial numbers, and they are associated with the serial numbers of the journal data and the relevant restoration points. In this embodiment, each restore point is established by slightly offsetting the exact date and time that the journal data was made.

Figure 6:
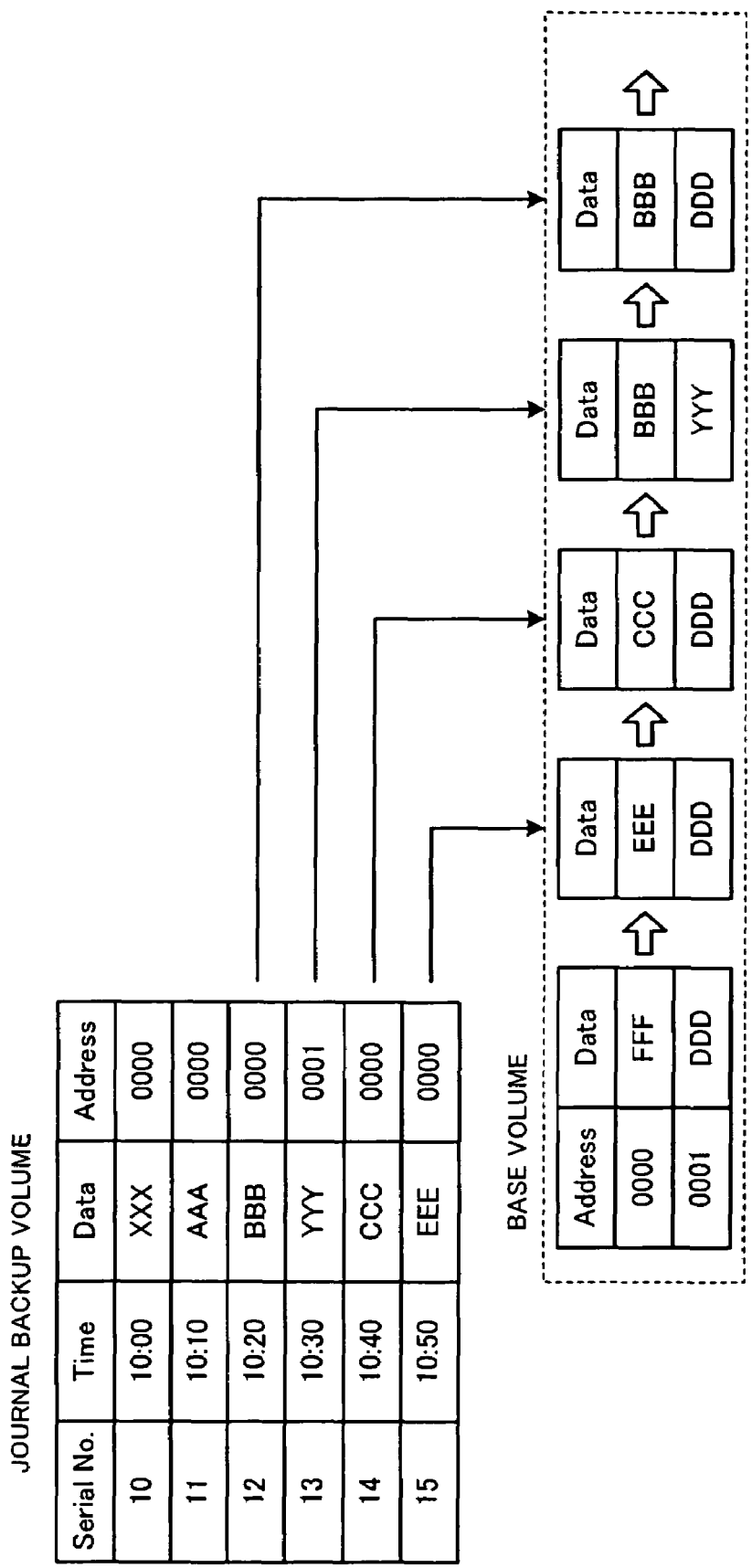
FIG. 6 illustrates backup data in a journal backup volume, and how the backup data is applied, in a storage apparatus according to an embodiment of the invention.

FIG. 6 illustrates backup data in a journal backup volume 41d in a storage apparatus 4 according to an embodiment of the invention, and also illustrates how the backup data is applied. As shown in FIG. 6, each item of backup data in the journal backup volume 41d is composed of backup data associated with the serial number of the journal data applied during the data restoration. However, as explained above, the backup data in the journal backup volume 41d is made by saving the data in the base volume 41a' to which certain journal data is going to be applied. Consequently, the backup data corresponds to journal data applied to the base volume in the previous serial number.

In addition, as shown in FIG. 6, the backup data is applied to the base volume from newer data (i.e., in descending order of serial numbers).

Figure 7:
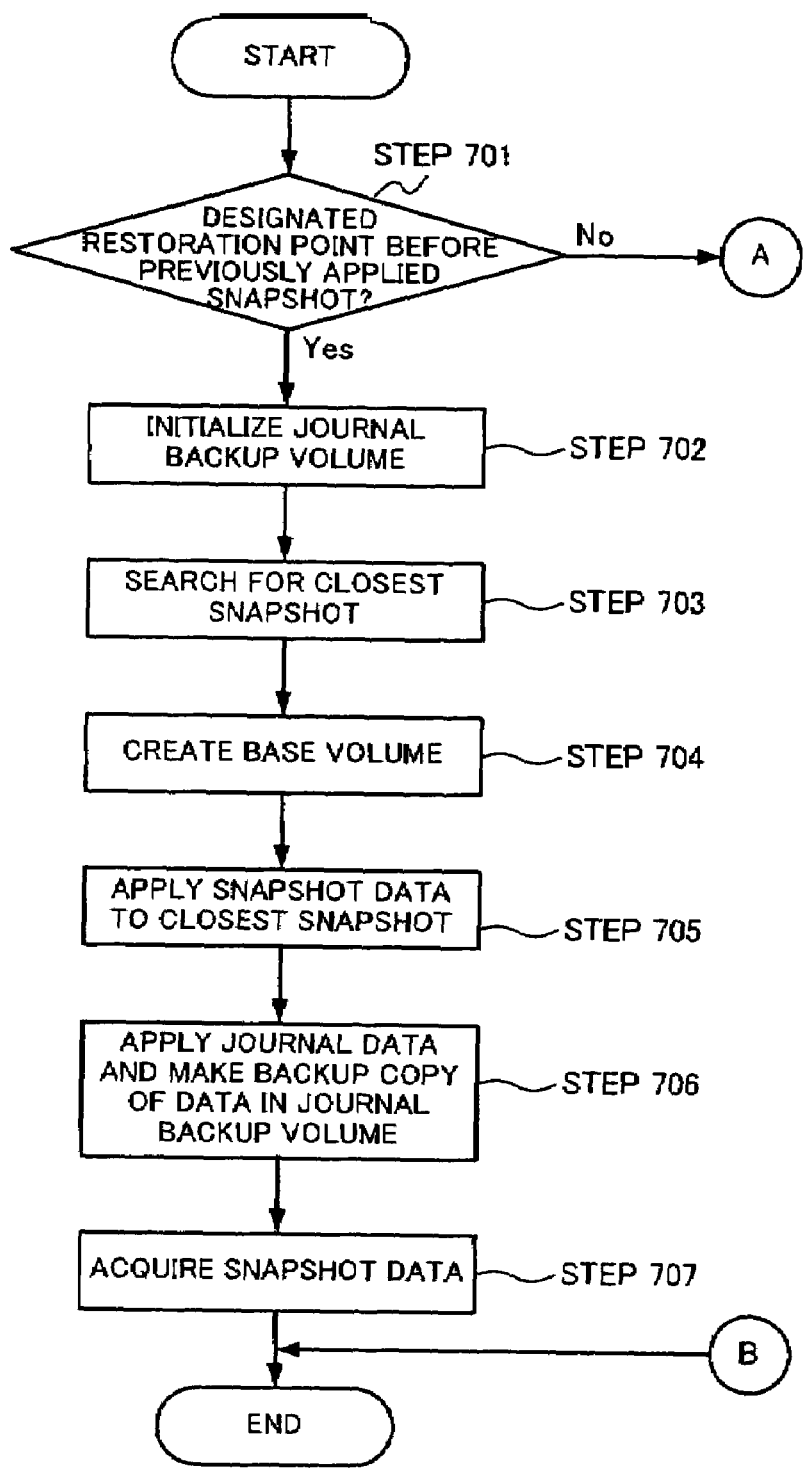
FIG. 7 is a flowchart for explaining data restoration processing in a storage apparatus according to an embodiment of the invention.
Figure 8:
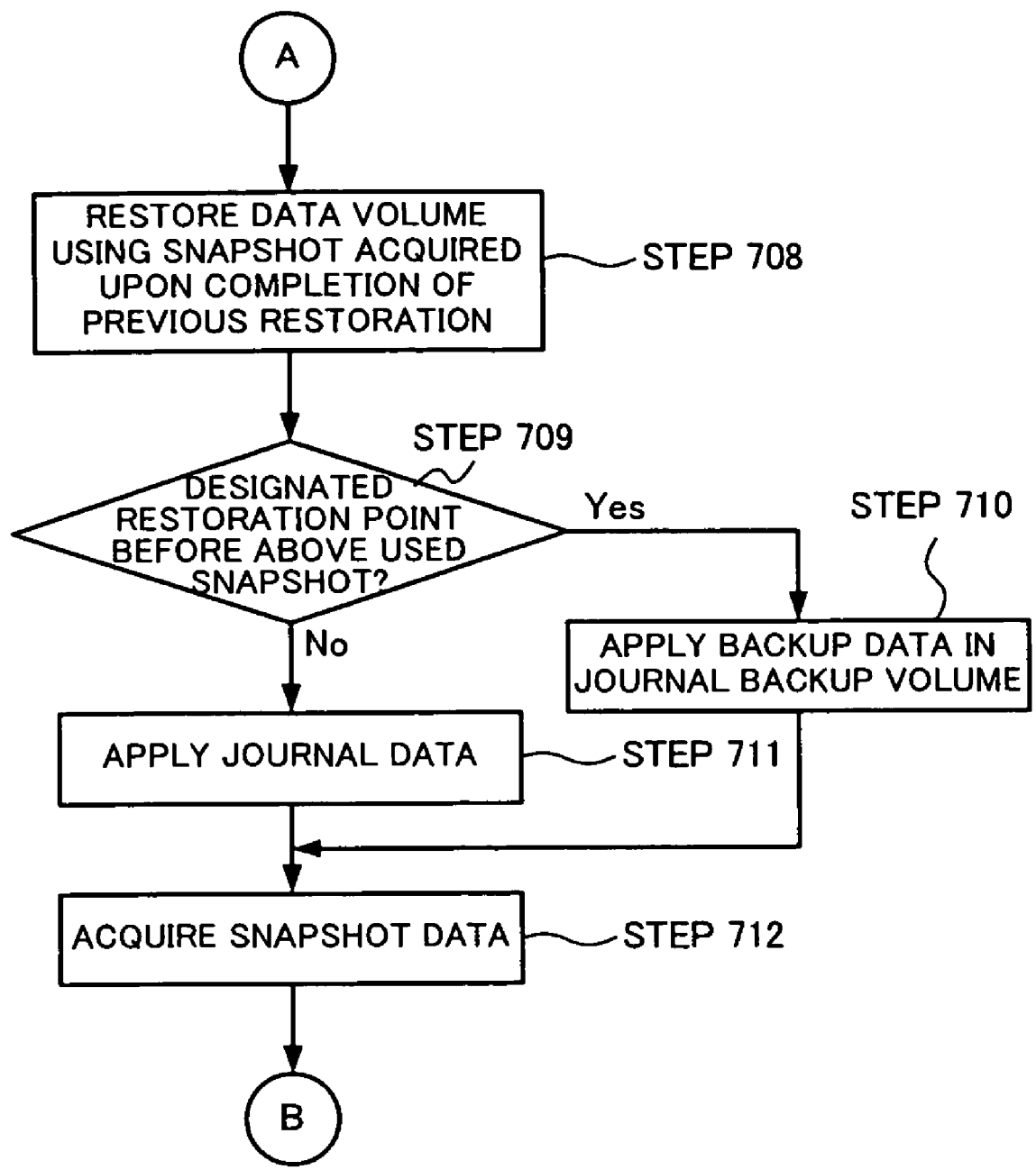
FIG. 8 is a flowchart for explaining data restoration processing in a storage apparatus according to an embodiment of the invention.

FIGS. 7 and 8 show a flowchart for explaining data restoration processing in a storage apparatus 4 according to an embodiment of the invention. The data restoration processing is achieved by the data restoration control program being executed on the controller 42.

Referring to FIG. 7, when the storage apparatus 4 receives a data restoration request from the host apparatus 2, the storage apparatus 4 determines whether the restore point designated in the restoration request is before the time of the snapshot based on which the previously applied snapshot data was obtained (STEP 701). If the storage apparatus 4 has never received a restoration request up to that time, or if the received restoration request can be regarded as a first request, for example, because it is a restoration request immediately after the data backup processing has been initialized, no previously applied snapshot exists, and in that case, the storage apparatus 4 regards the designated restore point as being before a previously applied snapshot. If the storage apparatus determines that the designated restore point is before the previously applied snapshot ('Yes' in STEP 701), the storage apparatus 4 initializes the journal backup volume 41d to be able to use the journal backup volume 41d (STEP 702). The initialization of the journal backup volume 41d is performed, for example, by deleting the existing journal backup volume 41d and creating a new one. Alternatively, the journal backup volume 41d may be initialized by a system administrator via a user interface provided by the storage manager. The journal backup volume 41d may also be configured to be initialized after a certain period of time from the last data restoration processing.

Next, the storage apparatus 4 specifies the snapshot taken at a closest preceding point to the designated restore point ("closest snapshot") (STEP 703), and creates a base volume 41a' for applying the closest snapshot (STEP 704). For example, if snapshots were taken at 9:30, 10:30, and 11:30, and the designated restore point is 10:35, the snapshot taken at 10:30 will be specified. The base volume 41a' is a replica of the data volume 41a, to be used as the base for applying the relevant snapshot data structured as difference data. The storage apparatus 4 creates a base volume 41a', for example, by replicating the data volume 41a at the current point in time in disk device(s) controlled by another disk adapter 425.

The storage apparatus 4 subsequently reads the snapshot data concerning the closest snapshot from the snapshot volume 41c, and applies it to the above-created base volume 41a' (STEP 705). If the snapshot data is structured as difference data, the difference data is sequentially applied. By way of applying the snapshot data to the base volume 41a', data as of the time when that snapshot was taken is restored in the base volume 41a'.

The storage apparatus 4 then reads relevant journal data from the journal volume 41b, and sequentially applies the read journal data to the base volume 41a' to which the snapshot data has been applied above. As a result, the data volume 41a as of the restore point will be restored. The journal data to be applied is any journal data made after the time of the closest snapshot but not after the designated restore point. In a process of applying the journal data, the storage apparatus 4 also stores the data in the base volume 41a' to which the journal data is going to be applied, in the journal backup volume 41d as journal backup data (STEP 706).

The storage apparatus 4 thereafter takes a snapshot of the restored data volume 41a to obtain snapshot data, and stores the obtained snapshot data in the snapshot volume 41c (STEP 707). After that, the storage apparatus 4 can restore the data volume efficiently, using the journal backup data stored in the journal backup volume 41d, under specific conditions.

On the other hand, if it is determined in STEP 701 that the designated restoration point is not before the previously applied snapshot, any journal backup data may exist in the journal backup volume 41d, so the storage apparatus 4 executes the processing shown in STEP 708 onward in FIG. 8.

More specifically, the storage apparatus 4 first applies the snapshot data obtained according to the snapshot taken upon completion of the previous restoration, to the currently used data volume 41a, so that data as of the snapshot time is restored in the data volume 41a (STEP 708). The storage apparatus 4 next determines whether the restoration point designated in the restoration request is before the snapshot taken upon completion of the previous restoration (STEP 709). This is to determine whether the restore point designated in the restoration request is within the period between the time of the snapshot applied according to the previous restoration request and the time of the snapshot taken upon completion of the restoration according to the previous restoration request, because there may be some journal backup data within the period. If the designated restore point is determined as being before the snapshot taken upon completion of the previous restoration ('Yes' in STEP 709), the storage apparatus 4 applies the relevant journal backup data stored in the journal backup volume 41d to the data volume 41a to which the snapshot data has been applied. The backup data stored in the journal backup volume 41d is applied sequentially from newer data. By way of this, the data volume 41a as of the restoration point designated in the restoration request can be restored.

If the designated restore point is determined in STEP 709 as being not before the snapshot made upon the completion of the previous restoration ('No' in STEP 709), the storage apparatus 4 cannot apply any journal backup data, and instead applies the journal data made in the period up until the designated restore point, to the data volume 41a to which the snapshot data has been applied, and thereby restores the data volume 41a in final form (STEP 711). In this case, the data to which certain journal data is going to be applied may be stored in the journal backup volume as journal backup data, as in the previous restoration. After that, the storage apparatus 4 takes a snapshot of the restored data volume to obtain snapshot data, and stores the obtained snapshot data in the snapshot volume (STEP 712).

Figure 9:
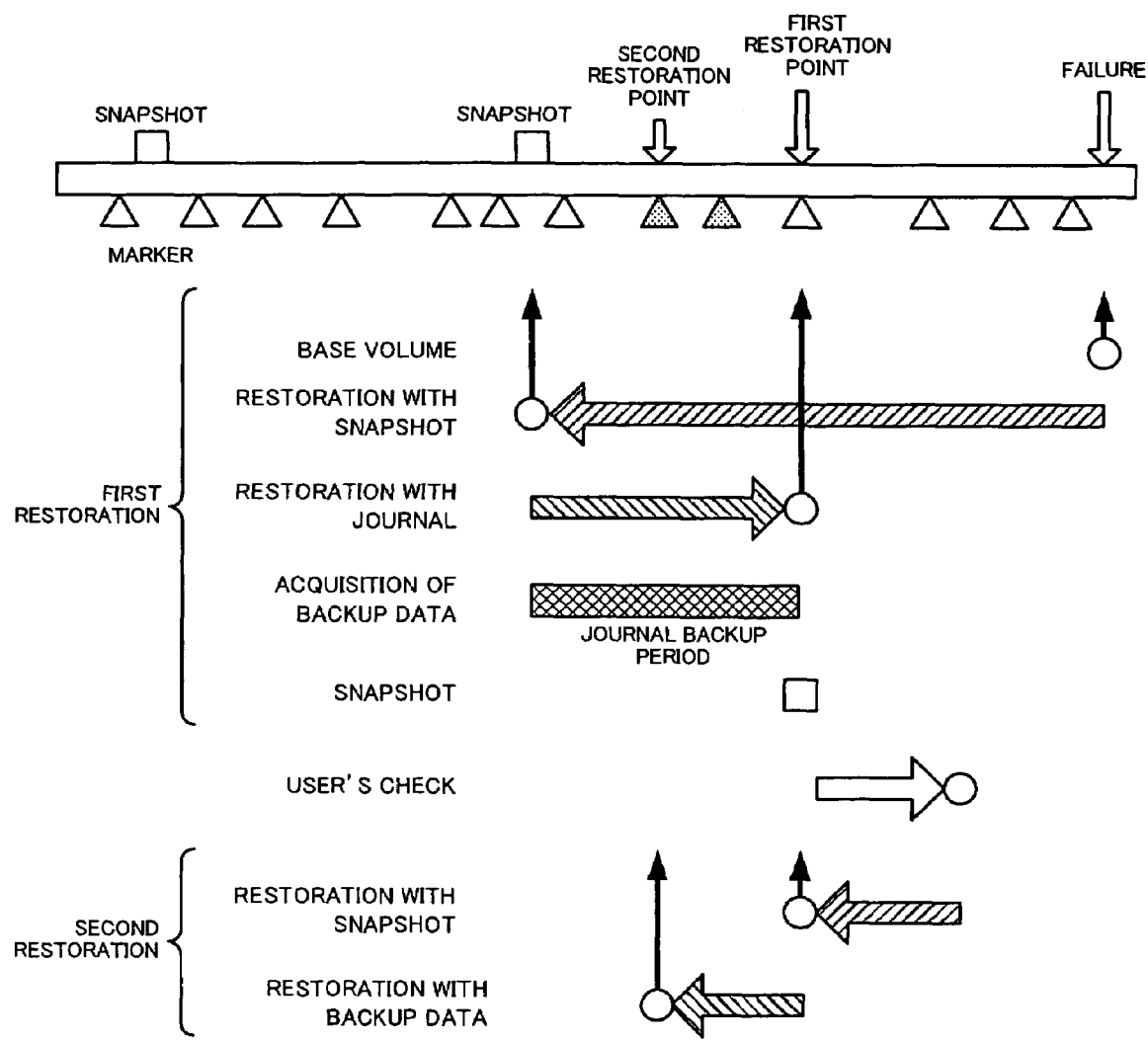
FIG. 9 is a time sequence for explaining data restoration processing in a storage apparatus according to an embodiment of the invention.

FIG. 9 explains data restoration processing in a storage apparatus 4 according to an embodiment of the invention, using a time sequence.

FIG. 9 assumes that, in the storage apparatus 4 operating on a certain time-line, a failure has occurred at a particular point in time. A system administrator gives the storage apparatus 4 a first restoration request designating a restore point. In response to the first restoration request, the storage apparatus 4 creates a base volume 41a', and by applying the relevant snapshot data, restores data as of the closest snapshot time in the base volume 41a'. The storage apparatus 4 subsequently applies the relevant journal data to the base volume 41a' while storing the data to which the journal data is going to be applied in the journal backup volume 41d, and thereby restores the data volume 41a in a final state. After that, the storage apparatus 4 takes a snapshot of the final restored data volume 41a, to obtain snapshot data.

After restoring data as described above, the system administrator checks the restored data. During the checking, if it is found that another data restoration is necessary, the system administrator gives the storage apparatus a second restoration request designating a different restore point. This example explains the case where the second designated restoration point is between the time of the first applied snapshot and the time of the snapshot taken upon completion of the first restoration.

In response the second restoration request, the storage apparatus 4 applies the snapshot data obtained according to the latest snapshot to the base volume 41a', and restores data as of that snapshot time in the base volume 41a'. The storage apparatus 4 subsequently applies the journal backup data stored in the journal backup volume 41d to the base volume 41a', and thereby restores the data volume 41a as of the designated restoration point.

As described above, since a snapshot is taken to obtain snapshot data immediately after data has been restored according to the first restoration request, it is possible to restore data efficiently according to any possible subsequent data restoration request.

In particular, with the restoration in response to the second restoration request, since the journal backup data stored in the journal backup volume 41d is used, more efficient data restoration can be achieved.

Figure 10:
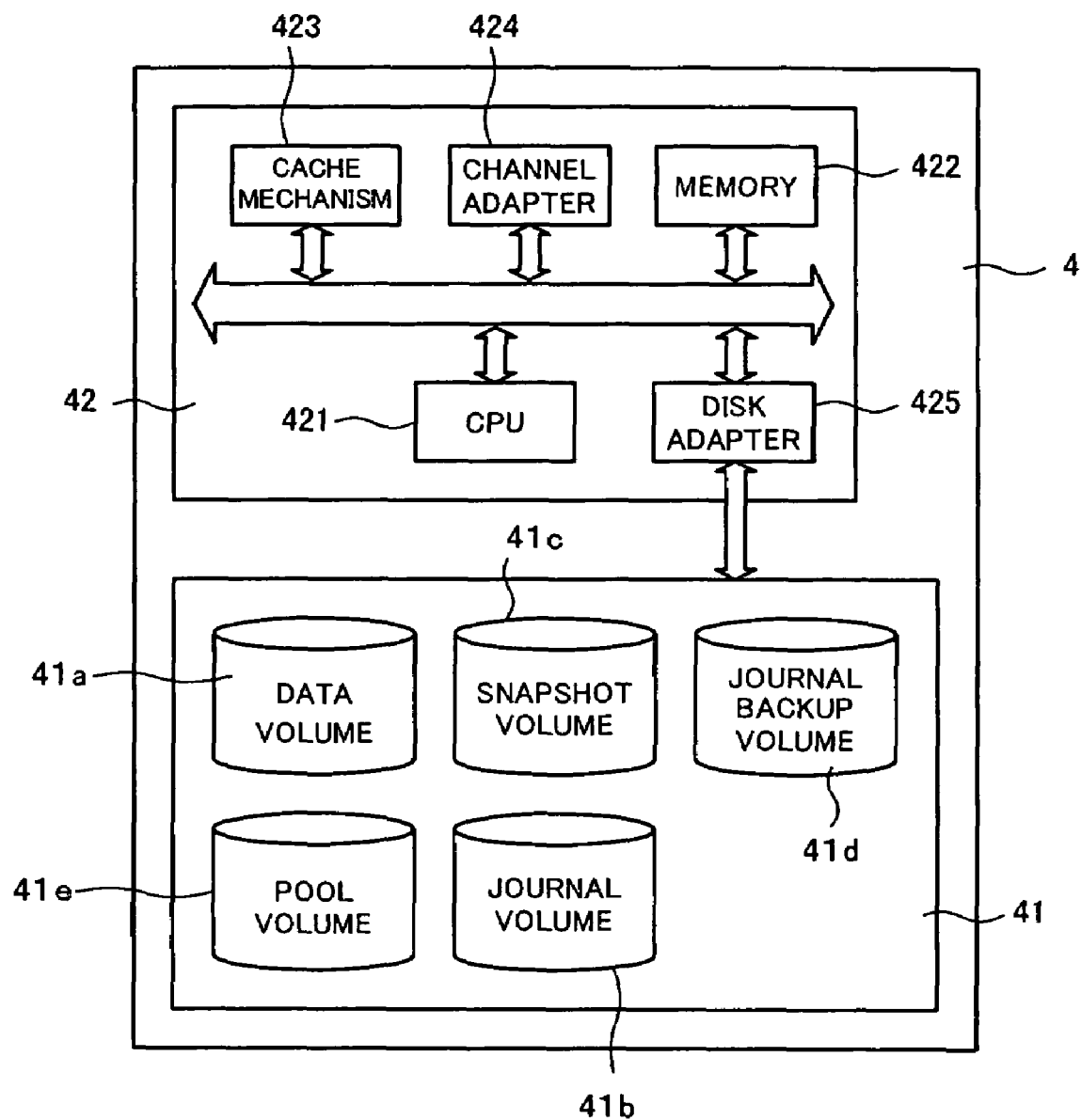
FIG. 10 illustrates the configuration of a storage apparatus according to an embodiment of the invention.

A storage apparatus 4 according to another embodiment of the invention is described below. FIG. 10 illustrates a configuration of a storage apparatus 4 according to an embodiment of the invention. The storage apparatus 4 according to this embodiment is configured to be able to establish a virtually defined logical volume (virtual logical volume) having a storage area, for example, of a planned future size, which is bigger than the size of the storage area provided by the actual disk devices (actual storage area). In other words, the storage apparatus 4 according to this embodiment can associate a logical volume in the storage unit 41 accessed by a host apparatus 2 with a virtual logical volume, and thereby enables dynamic upsizing/downsizing of the actual storage area according to the future operation status.

More specifically, as shown in FIG. 10, the storage unit 41 in the storage apparatus 4 according to this embodiment has a pool volume 41e. The pool volume 41e is a volume for providing an area for tentatively storing data to be stored in an area that is in a virtual logical volume other than the actual storage area provided by the data volume 41a, until additional disk devices are installed and the data volume 41a is expanded in the future. The details of how the pool volume 41e is defined is stored in the memory 422 as a part of the system configuration information.

As explained before, regarding the storage area provided by the data volume 41a, the storage apparatus 4 associates a logical address (LUN and LBA) recognized by the host apparatus 2 with a physical address in the disk devices set in the storage unit 41. With this configuration, the host apparatus 2 can access a desired storage area in the storage unit 41 by designating a specific logical address.

Figure 11:
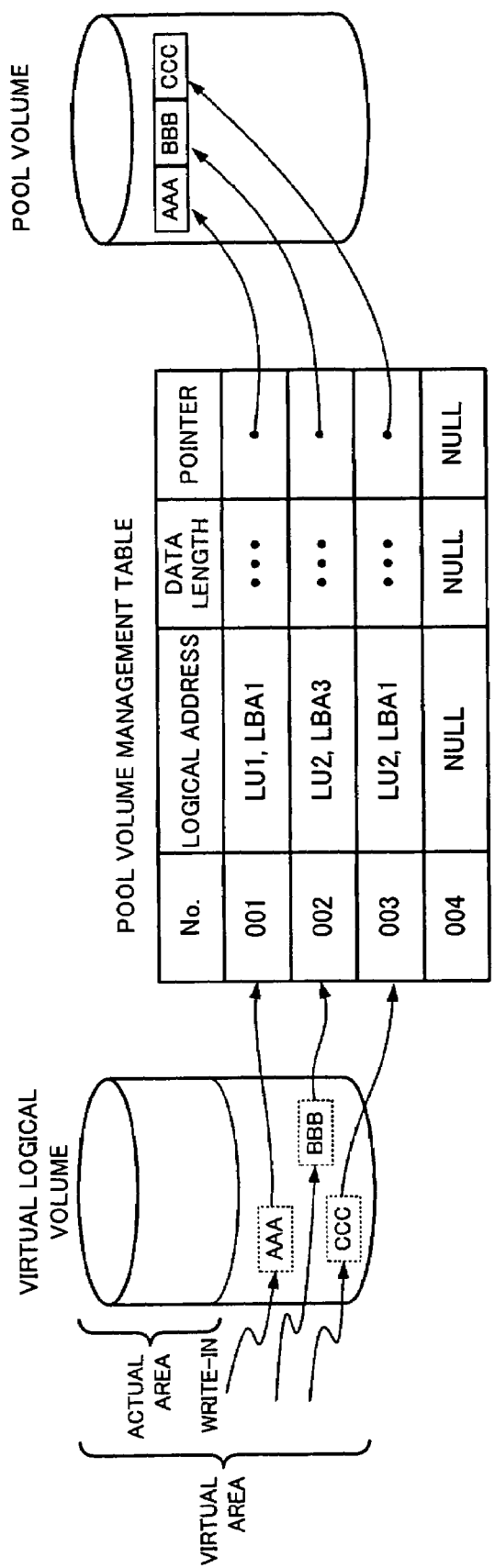
FIG. 11 illustrates a virtual logical volume in a storage apparatus according to an embodiment of the invention.

In contrast, regarding the storage area in the pool volume 41e, a logical address recognized by the host apparatus 2 is not directly associated with a physical address in the disk devices necessary for actual data access. As shown in FIG. 11, every time the host apparatus 2 gives a data-write request designating a storage area that is in the virtual logical volume other than the storage area (actual storage area) provided by the data volume 41a, the storage apparatus 4 associates a dynamically variable storage area with the pool volume 41e for the relevant data.

Thus, the storage apparatus 4 keeps a pool volume management table, by which the storage apparatus 4 manages the association of a dynamically variable storage area between the virtual logical volume and the pool volume. The pool volume management table is stored, for example, in the memory 422 in the controller 42. When the storage apparatus 4 receives a data-write request designating a logical address included in the virtual logical volume, but not in the actual storage area, the storage apparatus 4 stores the relevant data in the pool volume 41e, and records in the pool volume management table the designated logical address in association with a pointer showing the address in the pool volume 41e.

Figure 12:
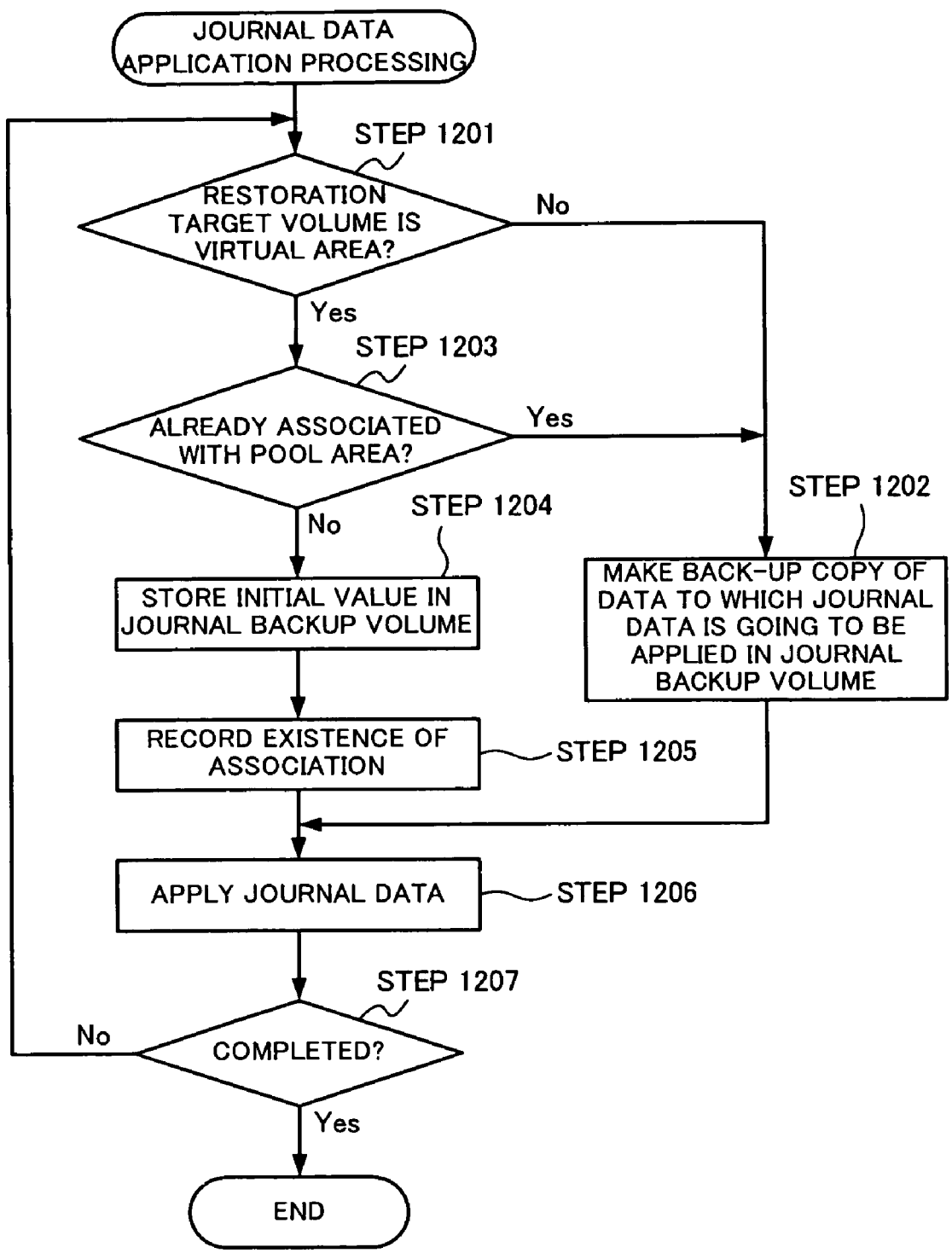
FIG. 12 is a flowchart for explaining processing when journal data is applied in a storage apparatus according to an embodiment of the invention.

FIG. 12 is a flowchart for explaining processing when journal data is applied in a storage apparatus 4 according to an embodiment of the invention. More specifically, the flowchart shown in FIG. 12 can be substituted for STEP 706 in FIG. 7. As explained before, the storage apparatus 4 according to the invention saves the data in a base volume 41a' to which certain journal data is going to be applied in a journal backup volume 41d, during data restoration processing. If a restoration target data volume 41a is a volume functioning as a virtual logical volume, as is the case in this embodiment, and if an area to which certain journal data is going to be applied is a virtual area other than the actual storage area, that area may have not yet been associated with the pool volume 41e when the journal data is going to be applied. Thus, the storage apparatus 4 manages the status of association with the pool volume 41e, thereby backing up the dynamically variable actual storage area.

More specifically, as described before, the storage apparatus 4 restores data as of the closest snapshot time in the base volume 41a' (STEP 705 in FIG. 7). Then, as shown in FIG. 12, the storage apparatus 4 determines whether the restoration target data volume 41a is a virtual logical volume or not (STEP 1201). This is conducted by referring to the system configuration information stored in the memory 422, and finding out whether the data volume 41a is given an attribute for a virtual logical volume. If the restoration target data volume 41a is not a virtual logical volume ('No' in STEP 1201), the storage apparatus 4 saves the data in the base volume 41a' to which certain journal data is going to be applied in the journal backup volume (STEP 1202) and then applies that journal data (STEP 1206). The storage apparatus 4 determines whether all the relevant journal data generated up to the designated restore point has been applied or not (STEP 1207), and if relevant journal data remains ('No' in STEP 1207), it goes back to STEP 1201.

If the restoration target data volume 41a is a virtual logical volume in STEP 1201 ('Yes' in STEP 1201), the storage apparatus 4 determines whether the area in the base volume 41a' to which certain journal data is going to be applied has already been associated with the pool volume 41e (STEP 1203). If it has already been associated with the pool volume 41e ('Yes' in STEP 1203), the storage apparatus 4 provides that area in the virtual area with the same processing as that executed for an area in the actual storage area (STEP 1202).

If it is determined in STEP 1203 that the area has not been associated with the pool volume 41e, the storage apparatus 4 stores an initial value in the journal backup volume (STEP 1204), and sets a flag indicating that association has been performed (STEP 1205). FIG. 13 illustrates backup data stored in a journal backup volume 41d in a storage apparatus 4 according to an embodiment of the invention. The initial value is, for example, '0' or 'null.' The storage apparatus 4 subsequently applies the journal data (STEP 1206), and repeats the above steps until all the relevant journal data generated up to the designated restoration point has been applied.

According to the backup processing explained above, even if the storage apparatus 4 handles a virtual logical volume, the storage apparatus 4 can restore data in the data volume 41a using data stored in the journal backup volume.

As explained before, the storage manager in the host apparatus 2 presents markers to the system administrator and then receives data restoration requests from he/she. In this embodiment, the storage manager provides the system administrator with a user interface whereby he/she is prompted to input whether he/she wishes to delete the association of a virtual area that has not yet been associated with the pool volume 41e when certain journal data is going to be applied to that area. The storage manager generates a data restoration request with that kind of association deletion request, and transmits it to the storage apparatus 4.

Figure 14:
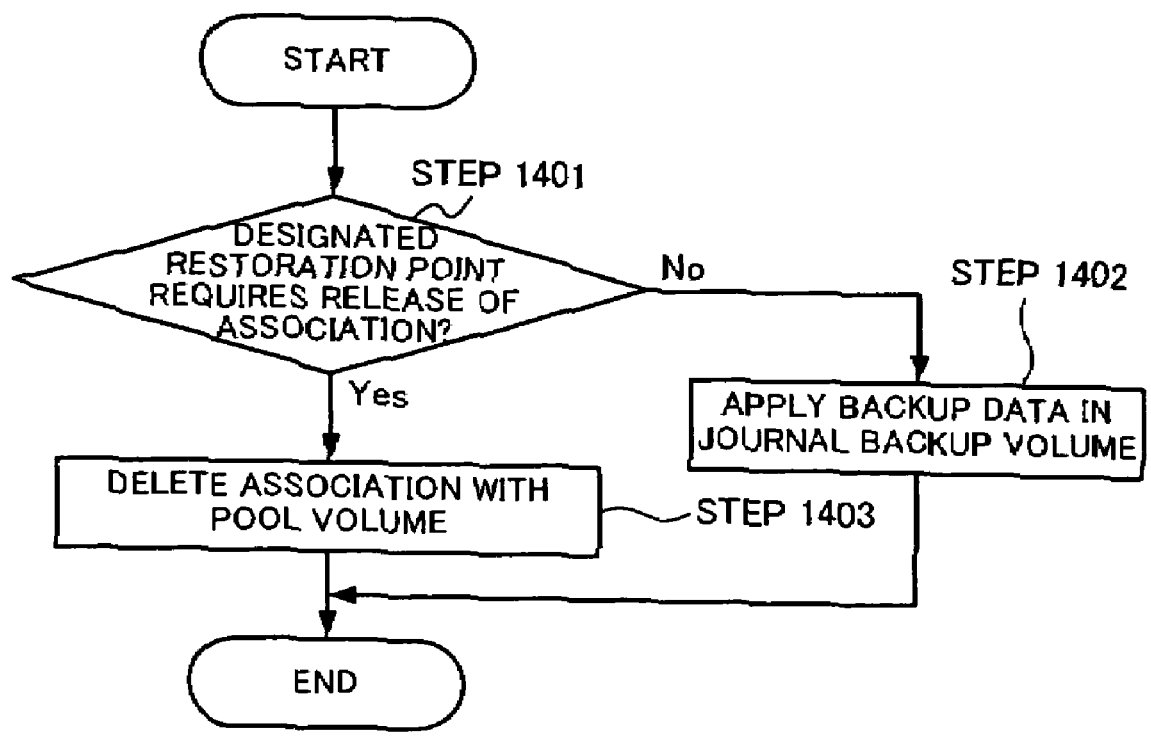
FIG. 14 is a flowchart for explaining processing when journal backup data is applied in a storage apparatus according to an embodiment of the invention.

FIG. 14 is a flowchart for explaining processing when journal backup data is applied in a storage apparatus 4 according to an embodiment of the invention. More specifically, the flowchart in FIG. 14 can be substituted for STEP 711 in FIG. 8.

As shown in FIG. 14, when the storage apparatus 4 receives a data restoration request from the host apparatus 2, the storage apparatus 4 determines whether that data restoration request includes an association deletion request or not (STEP 1401). If the data restoration request does not include an association deletion request ('No' in STEP 1401), the storage apparatus 4 applies the journal backup data stored in the journal backup volume 41d the same way as in normal restoration processing ('No' in STEP 1401).

If the data restoration request includes an association deletion request ('Yes' in STEP 1401), the storage apparatus 4 deletes the association of any applicable area, referring to the flag field in the pool volume management table, and thereby restores that area as an unassociated area (STEP 1402).

Accordingly, the system administrators can restore a data volume by arbitrarily choosing whether to restore a virtual area as an unassociated area, or as an associated area storing an initial value.

Several advantages result from a storage system according to the present invention, some of which have been discussed above.

When applying journal data, a storage apparatus according to the above embodiments saves the data in a base volume to which the journal data is going to be applied, in a journal backup volume. When the data volume has been restored by applying the journal data, the storage apparatus takes a snapshot of the data volume to obtain snapshot data and stores it in a snapshot volume. Accordingly, the storage apparatus can restore data efficiently in response to a later data restoration request, using the snapshot data obtained immediately after the previous restoration was completed. In addition to that snapshot data, using the journal backup data stored in the journal backup volume, the storage apparatus can restore a data volume efficiently.

Thus, according to the above embodiments, the system administrators can efficiently restore data even if they attempt data restoration using several different restoration points to obtain optimum restoration results.

The present invention can be widely applied to storage apparatuses storing computer-processed data. In particular, the invention can be applied to storage apparatuses used for data backup and restoration/recovery to prevent data loss.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage apparatus connected to a host apparatus, comprising:

a storage unit forming at least a data volume, a journal volume, a snapshot volume, and a journal backup volume therein; and a controller configured to control I/O processing with respect to the storage unit, wherein the controller generates, in response to an I/O request from the host apparatus, first journal data that includes write data for the data volume, and its serial number and time, and stores the first journal data in the journal volume, generates snapshot data for the data volume and stores the generated snapshot data in the snapshot volume;

wherein, upon receiving a first restoration request designating a first restore point, the controller performs a first data restoration including storing, in a base volume, the snapshot data of a first snapshot stored in the snapshot volume, restoring the data as of the first restore point, by applying the snapshot data of the first snapshot stored in the base volume and the first journal data stored in the journal volume sequentially, the first journal data to be applied being any journal data made after the time of the first snapshot but not after said first restore point, generating snapshot data of the data restored to the state in the first restore point, and storing, in the journal backup volume, second journal data that includes the data stored in the base volume before the first snapshot data is applied in the restoration, and its serial number and time;

wherein, if the controller receives, after the first data restoration, a second restoration request designating a second restore point that is between the time of the first snapshot and the first restore point, the controller restores the data as of the second restore point, by applying the snapshot data of the first snapshot stored in the base volume and the second journal data stored in the journal backup volume, the second journal data being applied sequentially from newer data in descending order of serial numbers;

wherein, if the controller receives, after the first data restoration, a second restoration request designating a second restore point that is not between the time of the first snapshot and the first restore point, the controller restores the data as of the second restore point, by applying the snapshot data of the first snapshot stored in the base volume and the first journal data stored in the journal volume in a period up until the second restore point.

2. The storage apparatus according to claim 1, further comprising a journal backup management table for storing management information for managing data stored in the journal backup volume.

3. The storage apparatus according to claim 1, wherein the data volume is defined as a virtual logical volume having an area exceeding the actual storage area provided by the storage unit,
 wherein the storage unit has a pool volume formed therein configured to store data to be stored in an area other than the actual storage area,
 wherein the controller has a pool volume management table for associating the area other than the actual storage area with the pool volume, and
 wherein the controller stores, in the journal backup volume, data in the pool volume to which the journal data is applied.

4. The storage apparatus according to claim 3, wherein the controller refers to the pool volume management table, and if the area other than the actual storage area in the data volume to which the snapshot data has been applied is determined as not having been associated with an area in the pool volume, stores an initial value in the journal backup volume.

5. A method for managing data in a storage apparatus connected to a host apparatus, the method comprising:
 forming a data volume, a journal volume, a snapshot volume, and a journal backup volume in a storage unit;
 storing journal data for the data volume in the journal volume, and storing first snapshot data for the data volume in the snapshot volume;
 generating, in response to an I/O request from the host apparatus, first journal data that includes write data for the data volume, and its serial number and time, and stores the first journal data in the journal volume;
 generating snapshot data for the data volume and storing the generated snapshot data in the snapshot volume;
 receiving a first restoration request designating a first restore point and in response thereto performing a first data restoration including
  storing, in a base volume, the snapshot data of a first snapshot stored in the snapshot volume,
  restoring the data as of the first restore point, by applying the snapshot data of the first snapshot stored in the base volume and the first journal data stored in the journal volume sequentially, the first journal data to be applied being any journal data made after the time of the first snapshot but not after said first restore point,
  generating snapshot data of the data restored to the state in the first restore point, and
  storing, in the journal backup volume, second journal data that includes the data stored in the base volume before the first snapshot data is applied in the restoration, and its serial number and time;
 if, after the first data restoration, a second restoration request is received designating a second restore point that is between the time of the first snapshot and the first restore point, restoring the data as of the second restore point, by applying the snapshot data of the first snapshot stored in the base volume and the second journal data stored in the journal backup volume, the second journal data being applied sequentially from newer data in descending order of serial numbers; and
 if, after the first data restoration, a second restoration request is received designating a second restore point that is not between the time of the first snapshot and the first restore point, restoring the data as of the second restore point, by applying the snapshot data of the first snapshot stored in the base volume and the first journal data stored in the journal volume in a period un until the second restore point.

6. The method according to claim 5, further comprising
 defining the data volume as a virtual logical volume having an area exceeding the actual storage area provided by the storage unit,
 wherein the forming includes forming a pool volume for storing data to be stored in an area other than the actual storage area, and
 wherein the applying the journal data includes storing, in the journal backup volume, data in the pool volume to which the journal data is going to be applied.

7. The method according to claim 6, further comprising:
 referring to a pool volume management table for associating the area other than the actual storage area with the pool volume,
 wherein the storing data in the journal backup volume includes storing an initial value in the journal backup volume if the area other than the actual storage area in the data volume to which the snapshot data has been applied is determined as not having been associated with an area in the pool volume.

8. A storage apparatus connected to a host apparatus, comprising:
 a storage unit forming at least a data volume, a journal volume, a snapshot volume, and a journal backup volume therein; and
 a controller configured to control I/O processing with respect to the storage unit,
 wherein the controller
  generates, in response to an I/O request from the host apparatus, first journal data that includes write data for the data volume, and its serial number and time, and stores the first journal data in the journal volume,
  generates snapshot data for the data volume and stores the generated snapshot data in the snapshot volume;
 wherein, upon receiving a first restoration request designating a first restore point, the controller performs a first data restoration including
  storing, in a base volume, the snapshot data of a first snapshot stored in the snapshot volume,
  restoring the data as of the first restore point, by applying the snapshot data of the first snapshot stored in the base volume and the first journal data stored in the journal volume sequentially, the first journal data to be applied being any journal data made after the time of the first snapshot but not after said first restore point,
  generating snapshot data of the data restored to the state in the first restore point, and
  storing, in the journal backup volume, second journal data that includes the data stored in the base volume before the first snapshot data is applied in the restoration, and its serial number and time;
 wherein the controller receives, after the first data restoration, a second restoration request designating a second restore point, and performs different data restoration processes depending on whether the second restore point is between the time of the first snapshot and the first restore point or not.

9. The storage apparatus according to claim 8,
 wherein the second restore point is between the time of the first snapshot and the first restore point, and the controller restores the data as of the second restore point, by applying the snapshot data of the first snapshot stored in the base volume and the second journal data stored in the journal backup volume, the second journal data being applied sequentially from newer data in descending order of serial numbers.

10. The storage apparatus according to claim 8, wherein the second restore point is not between the time of the first snapshot and the first restore point, and the controller restores the data as of the second restore point, by applying the snapshot data of the first snapshot stored in the base volume and the first journal data stored in the journal volume in a period up until the second restore point.

11. The storage apparatus according to claim 8, further comprising a journal backup management table for storing management information for managing data stored in the journal backup volume.

12. The storage apparatus according to claim 8, wherein the data volume is defined as a virtual logical volume having an area exceeding the actual storage area provided by the storage unit,
wherein the storage unit has a pool volume formed therein configured to store data to be stored in an area other than the actual storage area,
wherein the controller has a pool volume management table for associating the area other than the actual storage area with the pool volume, and
wherein the controller stores, in the journal backup volume, data in the pool volume to which the journal data is applied.

13. The storage apparatus according to claim 12, wherein the controller refers to the pool volume management table, and if the area other than the actual storage area in the data volume to which the snapshot data has been applied is determined as not having been associated with an area in the pool volume, stores an initial value in the journal backup volume.

14. A method for managing data in a storage apparatus connected to a host apparatus, the method comprising:
forming a data volume, a journal volume, a snapshot volume, and a journal backup volume in a storage unit;
storing journal data for the data volume in the journal volume, and storing first snapshot data for the data volume in the snapshot volume;
generating, in response to an I/O request from the host apparatus, first journal data that includes write data for the data volume, and its serial number and time, and stores the first journal data in the journal volume;
generating snapshot data for the data volume and storing the generated snapshot data in the snapshot volume;
receiving a first restoration request designating a first restore point and in response thereto performing a first data restoration including,
storing, in a base volume, the snapshot data of a first snapshot stored in the snapshot volume,
restoring the data as of the first restore point, by applying the snapshot data of the first snapshot stored in the base volume and the first journal data stored in the journal volume sequentially, the first journal data to be applied being any journal data made after the time of the first snapshot but not after said first restore point,
generating snapshot data of the data restored to the state in the first restore point, and
storing, in the journal backup volume, second journal data that includes the data stored in the base volume before the first snapshot data is applied in the restoration, and its serial number and time;
receiving, after the first data restoration, a second restoration request designating a second restore point; and
performing different data restoration processes depending on whether the second restore point is between the time of the first snapshot and the first restore point or not.

15. The method according to claim 14, wherein the second restore point is between the time of the first snapshot and the first restore point, the method further comprising:
restoring the data as of the second restore point, by applying the snapshot data of the first snapshot stored in the base volume and the second journal data stored in the journal backup volume, the second journal data being applied sequentially from newer data in descending order of serial numbers.

16. The method according to claim 14, wherein the second restore point is not between the time of the first snapshot and the first restore point, the method further comprising:
restoring the data as of the second restore point, by applying the snapshot data of the first snapshot stored in the base volume and the first journal data stored in the journal volume in a period up until the second restore point.

17. The method according to claim 14, further comprising defining the data volume as a virtual logical volume having an exceeding the actual storage area provided by the storage unit,
wherein the forming includes forming a pool volume for storing data to be Stored in an other than the actual storage area, and
wherein the applying the journal data includes storing, in the journal backup volume, data in the pool volume to which the journal data is going to be applied.

18. The method according to claim 17, further comprising:
referring to a pool volume management table for associating the area other than the actual storage area with the pool volume,
wherein the storing data in the journal backup volume includes storing an initial value in the journal backup volume if the area other than the actual storage in the data volume to which the snapshot data has been applied is determined as not having been associated with an area in the pool volume.

* * * * *